United States Patent
Nishi et al.

(10) Patent No.: US 9,656,870 B2
(45) Date of Patent: May 23, 2017

(54) METAL ENCAPSULATED DENDRITIC CARBON NANOSTRUCTURE, CARBON NANOSTRUCTURE, PROCESS FOR PRODUCING METAL ENCAPSULATED DENDRITIC CARBON NANOSTRUCTURE, PROCESS FOR PRODUCING CARBON NANOSTRUCTURE, AND CAPACITOR

(75) Inventors: Nobuyuki Nishi, Okazaki (JP); Shigenori Numao, Okazaki (JP); Ken Judai, Okazaki (JP); Junichi Nishijo, Okazaki (JP); Kazuhiko Mizuuchi, Kitakyushu (JP)

(73) Assignees: Nippon Steel & Sumikin Chemical CO., LTD, Tokyo (JP); Inter-University Research Institute Corporation, National Institutes of Natural Sciences, Tokyo (JP)

( * ) Notice: Subject to any disclaimer, the term of this patent is extended or adjusted under 35 U.S.C. 154(b) by 703 days.

(21) Appl. No.: 12/747,233

(22) PCT Filed: Dec. 9, 2008

(86) PCT No.: PCT/JP2008/072330
§ 371 (c)(1),
(2), (4) Date: Jul. 19, 2010

(87) PCT Pub. No.: WO2009/075264
PCT Pub. Date: Jun. 18, 2009

(65) Prior Publication Data
US 2011/0058308 A1    Mar. 10, 2011

(30) Foreign Application Priority Data

Dec. 12, 2007   (JP) .................................. 2007-321170
May 2, 2008    (JP) .................................. 2008-120233

(51) Int. Cl.
*H01G 9/00*    (2006.01)
*H01B 1/04*    (2006.01)
(Continued)

(52) U.S. Cl.
CPC .......... *C01B 31/0206* (2013.01); *B82Y 30/00* (2013.01); *B82Y 40/00* (2013.01);
(Continued)

(58) Field of Classification Search
CPC ......... H01G 9/155; H01G 9/058; Y02E 60/13
(Continued)

(56) References Cited

U.S. PATENT DOCUMENTS

2004/0248010 A1* 12/2004 Kato et al. ................. 429/231.8
2005/0083635 A1*  4/2005 Ooma et al. .................. 361/305
(Continued)

FOREIGN PATENT DOCUMENTS

CN    1448335    10/2003
EP    1834925    9/2007
(Continued)

OTHER PUBLICATIONS

Counterpart application Chinese Office Action dated Apr. 19, 2012; 4 pages of Office Action in Chinese and 4 pages of Office Action as an English translation—total of 8 pages.
(Continued)

*Primary Examiner* — Eric Thomas
*Assistant Examiner* — Arun Ramaswamy
(74) *Attorney, Agent, or Firm* — Oliff PLC

(57) ABSTRACT

This invention provides a metal encapsulated dendritic carbon nanostructure comprising a dendritic carbon nanostructure comprising a branched carbon-containing rod-shaped or annular material and a metallic body capsulated in the carbon nanostructure. There is also provided a dendritic carbon nanostructure comprising a branched carbon-containing rod-shaped or annular material.

25 Claims, 11 Drawing Sheets

(51) Int. Cl.
*H01B 1/22* (2006.01)
*H01G 4/005* (2006.01)
*C01B 31/02* (2006.01)
*B82Y 30/00* (2011.01)
*B82Y 40/00* (2011.01)
*H01G 11/36* (2013.01)
*H01G 11/24* (2013.01)
*H01G 11/28* (2013.01)

(52) U.S. Cl.
CPC ............. *H01G 11/24* (2013.01); *H01G 11/28* (2013.01); *H01G 11/36* (2013.01); *C01P 2006/12* (2013.01); *Y02E 60/13* (2013.01); *Y10T 428/2982* (2015.01); *Y10T 428/2991* (2015.01)

(58) Field of Classification Search
USPC .......................... 361/503, 502, 303; 252/503
See application file for complete search history.

(56) References Cited

U.S. PATENT DOCUMENTS

| | | |
|---|---|---|
| 2006/0165584 A1 | 7/2006 | Gogotsi |
| 2006/0267235 A1* | 11/2006 | Ma et al. ..................... 264/105 |
| 2007/0076349 A1* | 4/2007 | Dementiev et al. .......... 361/502 |
| 2007/0104867 A1 | 5/2007 | Haba |
| 2008/0049380 A1* | 2/2008 | Miyahara et al. ............ 361/502 |

FOREIGN PATENT DOCUMENTS

| | | |
|---|---|---|
| JP | 2002-293521 | 10/2002 |
| JP | 2002293521 A * | 10/2002 ............ C01B 31/02 |
| JP | 2006-062954 | 3/2006 |
| JP | 2006-290691 | 10/2006 |
| JP | 2006-294493 | 10/2006 |
| JP | 2006294493 A * | 10/2006 |
| JP | 2007-035811 | 2/2007 |
| JP | 2007035811 A * | 2/2007 |
| JP | 2007-126338 | 5/2007 |
| JP | 2007126338 A * | 5/2007 |
| JP | 2007182352 A * | 7/2007 |
| JP | 2007-284336 | 11/2007 |
| JP | 2007284336 A * | 11/2007 |
| JP | 2007-182352 | 6/2010 |
| WO | 2006073017 | 7/2006 |
| WO | 2007078005 | 7/2007 |

OTHER PUBLICATIONS

Zhenyu Yao et al., Synthesis of novel Y-junction hollow carbon nanotrees, Carbon, Jun. 2007, 45, pp. 1566-1570.

* cited by examiner

METAL ENCAPSULATED DENDRITIC CARBON NANOSTRUCTURE, CARBON NANOSTRUCTURE, PROCESS FOR PRODUCING METAL ENCAPSULATED DENDRITIC CARBON NANOSTRUCTURE, PROCESS FOR PRODUCING CARBON NANOSTRUCTURE, AND CAPACITOR

TECHNICAL FIELD

The present invention relates to a carbon encapsulated dendritic carbon nanostructure and a carbon nanostructure which constitute a base material for a fuel-cell-electrode, hydrogen storage compounds and various catalyst carriers using nanotechnology and to a process for producing them. Moreover, the present invention relates to a capacitor using the carbon nanostructure.

BACKGROUND ART

Carbon materials are applied for low temperature fuel cells, electrodes of respective supercapacitors or catalyst carriers in liquid-phase catalytic reaction. Therefore, the carbon material becomes important more than ever while the cost reduction for the production of the carbon materials is more and more required. In the use of the carbon materials as the electrodes or the catalyst carriers, the high porosities of the respective carbon materials are important in view of high fluidity of gas and liquid. In the use of the carbon materials as the electrodes, the high electric conductivities and current densities of the respective carbon materials are important. As a carbon material satisfying the above-described requirements can be exemplified a carbon sintered body commercially available wherein platinum particles are dispersed in carbon nanotubes or carbon nanohorns and sintered at high temperature or carbon fibers are mixed with a carbon material and sintered.

The thus obtained carbon material is, however, shaped in a form of sheet by firing the carbon nanotubes, the carbon nanohorns or the carbon fibers, which are inherently separated, at high temperature. In this case, the high porosity and the high electric conductivity in a medium transmission direction of the carbon material are conflicting factors one another.

The porous carbon material, on the other hand, raises expectations for a hydrogen storage capacitor functioning as a metallic atom/cluster supporting carbon nano-sized micropore material by itself. As a carbon material capable of exhibiting the above-described effect/function, an attention is paid to such a carbon nanotube. However, the storage performance of the carbon nanotube cannot be practically utilized under low pressure. Alternatively, a metallic material has some problems of heavy weight thereof and being incapable of exhausting hydrogen stored therein if the metallic material is not positioned at high temperature practically impossible, resulting in not being practically utilized.

In Patent reference 1, in this point of view, a porous structural material is made by using a carbide and a halogen. Such a technique, however, teaches only to control the combination of the carbide and the halogen to be employed to control the sizes of pores of the material, but does not refer to the increase and decrease of the pores at all. The carbon structural material, therefore, does not satisfy the high porosity and high electric conduction sufficiently.

Recently, the cost of gasoline is raised so that the energy problems become critical issue. For example, a hybrid system or the like is being developed in order to convert the kinetic energy generated by the combustion of gasoline in an automobile engine into the corresponding electric energy in view of the effective utilization of the gasoline. Such a hybrid system requires an electric storage device capable of conducting electric charge and discharge under the condition of large current and high speed. As the electric storage device may be exemplified a nickel hydride/lithium secondary battery, a supercapacitor or a combination thereof.

The supercapacitor is called as an electric double layer capacitor and electrically charged by adsorbing minus ions on the surface of the positive electrode thereof and plus ions on the surface of the negative electrode thereof. In order to enhance the capacitance of the supercapacitor sufficiently, the surface areas of the positive and negative electrodes thereof are increased as large as possible so that the ions are adsorbed onto the positive and negative electrodes thereof as much as possible.

In this point of view, as the electrode material of the supercapacitor would be used a porous carbon material because the porous carbon material has an electric conduction to some degrees and does not generate the chemical reaction for the electrolyte material. For example, the porous material is made by contacting a given carbon material with a moisture at high temperature for the formation of pore or by alkali activation of treating a given carbon material with a molten salt of alkaline metal hydroxide.

In the case that the carbon material is rendered porous with the moisture, there are problems that the electrostatic capacitance per unit volume of the carbon material is decreased even though the substantial surface area of the carbon material is increased because the bulk density of the carbon material is decreased and the production yield for the porous carbon material is decreased. In the alkaline activation, there is a problem that the volume expansions of the thus obtained electrodes at initial electric charge become large, which may result in the breakage of the cell of the supercapacitor in an extreme case. There is also a problem that the device cost of the supercapacitor becomes too large for ensuring its safety because the resultant alkaline metal as a byproduct is higher reactive.

In both techniques, therefore, a supercapacitor usable practically and the porous carbon material usable for the supercapacitor cannot be provided.

In this point of view, such an attempt as obtaining a porous carbon material with a sufficient specific surface area is made from the beginning without the use of the post-treatment such as the moisture exposure and the alkaline molten salt treatment. For example, Patent reference 2 teaches that an organic resin such as a polyvinyl alcohol or a polystyrene is heated with inorganic particles made of, e.g., magnesium oxide to precipitate the resultant carbides on the surfaces of the inorganic particles and then remove the resultant carbides by means of acid cleaning, thereby producing a porous carbon material.

However, there is a problem that the porous carbon material obtained by the above-described method is not excellent in production yield so that the cost of the porous carbon material is raised. There is also a problem that the specific surface area of the porous carbon material cannot be realized so that the porous carbon material cannot have an electrostatic capacitance enough to be used as a supercapacitor.

Patent Reference 1: US 2006/0165584 A1
Patent Reference 2: JP-A 2006-062954 (KOKAI)

DISCLOSURE OF THE INVENTION

Problem to be Solved by the Invention

In this point of view, it is an object of the present invention to provide a new structural carbon material capable of satisfying high porosity and high electric conduction simultaneously and a capacitor using the carbon material.

Technical Solution

In order to achieve the object of the present invention, the present invention relates to a metal encapsulated dendritic carbon nanostructure including: a dendritic carbon nanostructure including a branched carbon-containing rod-shaped or annular material; and a metallic body encapsulated in the dendritic carbon nanostructure.

The present invention also relates to a dendritic carbon nanostructure including a branched carbon-containing rod-shaped or annular material.

Since the carbon nanostructure of the present invention has the branched carbon-containing rod-shaped or annular material, the carbon nanostructure can have high porosity in itself. Moreover, since the metal encapsulated dendritic carbon nanostructure encapsulates a metallic body in itself, the metal encapsulated dendritic carbon nanostructure can have high electric conduction. Therefore, the metal encapsulated dendritic carbon nanostructure can be used as a carbon structural body (carbon material) having high porosity and high electric conduction and thus can be used for an electrode, an catalyst supporting electrode, etc.

Furthermore, since the carbon nanostructure has such a dendritic structure, the carbon nanostructure has high specific surface area. Therefore, the carbon nanostructure can store any gas such as hydrogen gas and thus function sufficiently as a gas molecule storage material. Also, the carbon nanostructure can function sufficiently as a catalyst supporting carrier.

In the present invention, "nanostructure" means a structure with a dimension in the order of several nanometers through several hundred nanometers.

The carbon structure disclosed in Patent reference 1 is configured as a porous carbon nanostructure by melting a metal component of, e.g., a $Ti_2SiC_2$ material using a halogen, and thus the production process in Patent reference 1 is quite different from the production process of the metal encapsulated dendritic carbon nanostructure of the present invention as will described below. According to Patent reference 1, therefore, the metal encapsulated dendritic carbon nanostructure and the carbon nanostructure cannot be produced. In fact, Patent reference 1 does not refer to such a dendritic carbon nanostructure or the like.

The metal encapsulated dendritic carbon nanostructure and the carbon nanostructure can be produced according to the production processes as will described below.

Namely, the production process of the metal encapsulated dendritic carbon nanostructure including the steps of preparing a solution containing a metal or a salt thereof; blowing an acetylene gas into the solution under an irradiation of ultrasonic wave to form a dendritic crystalline body containing the metal and a carbon; and heating the dendritic crystalline body to segregate the metal therein, thereby forming a metal encapsulated dendritic carbon nanostructure configured such that the metal is encapsulated in a dendritic carbon nanostructure including a branched carbon-containing rod-shaped or annular material.

Also, the production process of the carbon nanostructure including the steps of: preparing a solution containing a metal or a salt thereof; blowing an acetylene gas into the solution under an irradiation of ultrasonic wave to form a dendritic crystalline body containing the metal and a carbon; and conducting a first thermal treatment to the dendritic crystalline body to segregate the metal therein, thereby forming a metal encapsulated dendritic carbon nanostructure configured such that the metal is encapsulated in a dendritic carbon nanostructure including a branched carbon-containing rod-shaped or annular material; and conducting a second thermal treatment to the metal encapsulated dendritic carbon nanostructure to blow the metal off therefrom.

Here, the capacitor of the present invention is characterized by using the carbon nanostructure and thus includes a pair of electrodes, an electrolyte fluid charged between the pair of electrodes, a separator positioned in the electrolyte fluid, wherein at least one of the pair of electrodes includes a dendritic carbon nanostructure including a branched carbon-containing rod-shaped or annular material.

Advantageous Effect

According to the present invention can be provided a new structural carbon material capable of satisfying high porosity and high electric conduction simultaneously and a capacitor using the carbon material.

BEST MODE FOR CARRYING OUT THE INVENTION

Figure 1:
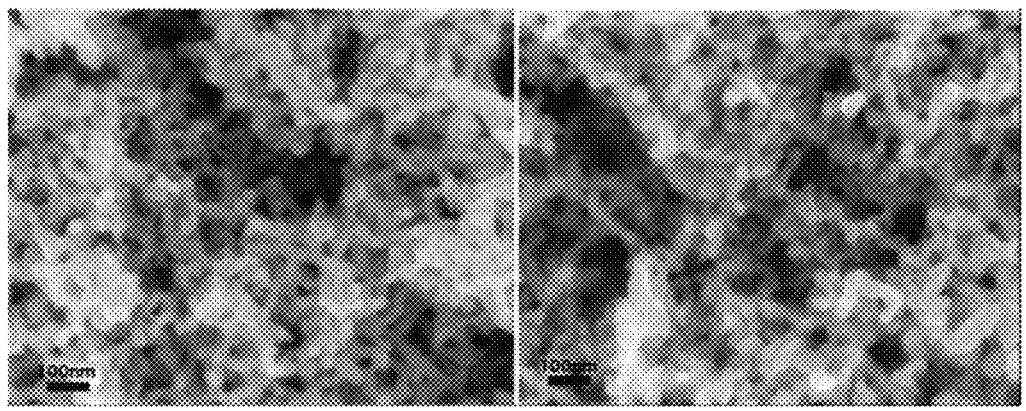
FIG. 1 is a SEM image of a metal encapsulated dendritic carbon nanostructure according to the present invention.

Hereinafter, details, other features and advantages of the present invention will be described.

(Metal Encapsulated Dendritic Carbon Nanostructure)

The metal encapsulated dendritic carbon nanostructure of the present invention includes, as described above, a carbon nanostructure with a branched carbon-containing rod-shaped or annular material and a metallic body encapsulated in the carbon nanostructure.

In the carbon nanostructure, the length of the branched portion becomes 150 nm or less in accordance with the production process thereof as will described below, for example. Moreover, the diameter of the branched portion becomes 150 nm or less. Namely, the carbon nanostructure is an extremely minute dendritic structure. The lower limited values of the length and diameter of the branched portion are 50 nm and 20 nm, respectively, for example.

Since the metal encapsulated dendritic carbon nanostructure encapsulates the metallic body in itself, the metal encapsulated dendritic carbon nanostructure exhibit electric conduction. Therefore, the metal encapsulated dendritic carbon nanostructure can be constituted as a carbon structure (carbon material) satisfying high porosity and high electric conduction sufficiently so as to be preferably applied for an electrode or an catalyst-supporting electrode.

In the metal encapsulated dendritic carbon nanostructure, the carbon-containing rod-shaped or annular material generally exhibits three-dimensional structure commensurate with the production process as will be described below. Namely, the rod-shaped or annular material is elongated three-dimensionally and connected with one another to form the dendritic structure.

Moreover, the metallic body may be made of Ag. In this case, as will described below, if the metallic body is made of Ag, the preparation and adjustment for raw materials in the production process of the metal encapsulated dendritic carbon nanostructure can be easily conducted. Moreover, since the Ag has extreme electric conduction, the reasonability of the metal encapsulated dendritic carbon nanostructure as the use of an electrode material or the like can be much developed.

Then, the production process of the metal encapsulated dendritic carbon nanostructure will be described. Herein, the production process will be described in the case that the Ag is particularly employed as the metal to be encapsulated in the metal encapsulated dendritic carbon nanostructure.

First of all, an acetylene gas is blown into a silver nitrate-containing ammonia aqueous solution with irradiating ultrasonic wave into the aqueous solution. In this case, preferably, the aqueous solution is agitated at the same time when the aqueous solution is treated by way of the ultrasonic wave. Thereby, the precipitate of silver acetylide is formed in the aqueous solution. The irradiation of ultrasonic wave can be conducted by setting an ultrasonic transducer in the container containing the aqueous solution or setting the container in an ultrasonic cleaner.

Then, the precipitate containing the corresponding solvent is segmented into small groups and set into respective reactive tubes which are also set in a vacuum electric furnace or vacuum high temperature bath and heated at a temperature within a range of 60° C. to 80° C. for 12 hours or more, for example. In this case, the silver acetylide is segregated to form the metal encapsulated dendritic nanostructure encapsulating the metallic silver particles (refer to FIGS. 1 and 2). In FIG. 2, the black portion denotes the silver (Ag) particles and the gray portion denotes the carbon layer formed so as to encapsulate the silver particles.

Here, if the precipitate is perfectly dried, the precipitate may become unstable to cause explosion reaction by rubbing stimulation, etc. The solvent to be contained in the precipitate may be another solvent independently prepared and different from the water, but may be the water as it is. In the former case, another solvent can be infiltrated into the precipitate by way of washing.

Figure 2:
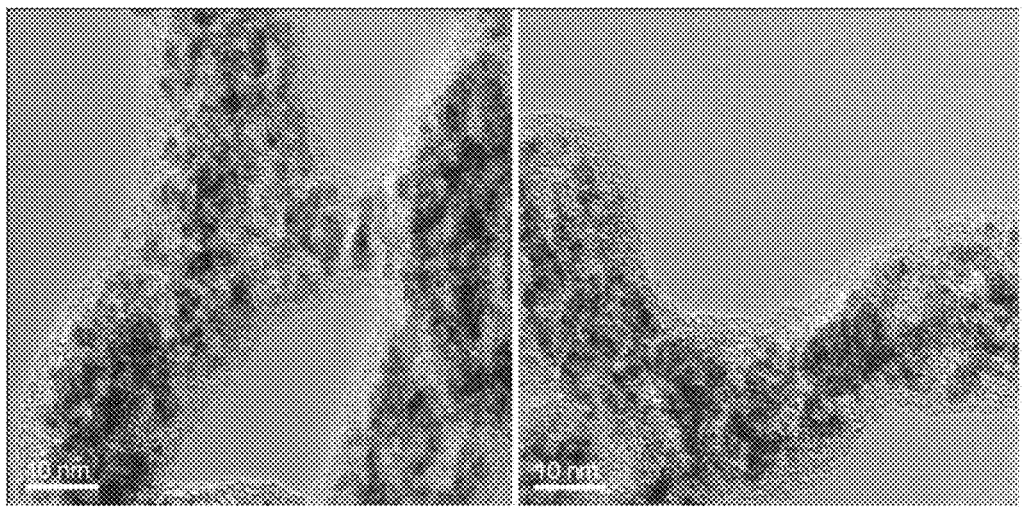
FIG. 2 is also a SEM image of a metal encapsulated dendritic carbon nanostructure according to the present invention.

As apparent from FIGS. 1 and 2, moreover, it is confirmed that in the metal encapsulated dendritic carbon nanostructure, the rod-shaped or annular material containing the silver and the carbon is elongated three-dimensionally and connected with one another to form the network structure and thus the three-dimensional dendritic structure.

In the above embodiment, the case that the metal encapsulated dendritic carbon nanostructure contains the Ag as the metal to be encapsulated is described. In the case that another metal is encapsulated into the metal encapsulated dendritic carbon nanostructure, an appropriate raw material (salt, etc.) is employed instead of the silver nitrate so as to form a metal encapsulated dendritic carbon nanostructure containing another metal as a metal to be encapsulated.

(Carbon Nanostructure)

The carbon nanostructure of the present invention is a dendritic carbon nanostructure with a branched carbon-containing rod-shaped or annular material as described above.

In the carbon nanostructure, the length of the branched portion becomes 150 nm or less in accordance with the production process thereof as will described below, for example. Moreover, the diameter of the branched portion becomes 150 nm or less. Namely, the carbon nanostructure is an extremely minute dendritic structure. The lower limited values of the length and diameter of the branched portion are 50 nm and 20 nm, respectively, for example.

Since the carbon nanostructure is shaped in the dendritic form as described above, the carbon nanostructure has high specific surface area in itself. Therefore, the carbon nanostructure can store any gas such as hydrogen gas and thus function as a gas molecule storage material. Alternatively, the carbon nanostructure can function sufficiently as a catalyst carrier.

The carbon nanostructure can be obtained by performing an additional process for the metal encapsulated dendritic carbon nanostructure as an intermediary body so that the structure of the metal encapsulated dendritic carbon nanostructure is also maintained in the carbon nanostructure. In this case, therefore, the carbon nanostructure includes the rod-shaped or annular material as described above which is three-dimensionally elongated and connected with another rod-shaped or annular material to form the network structure and thus exhibit the three-dimensional dendritic structure.

Figure 3:
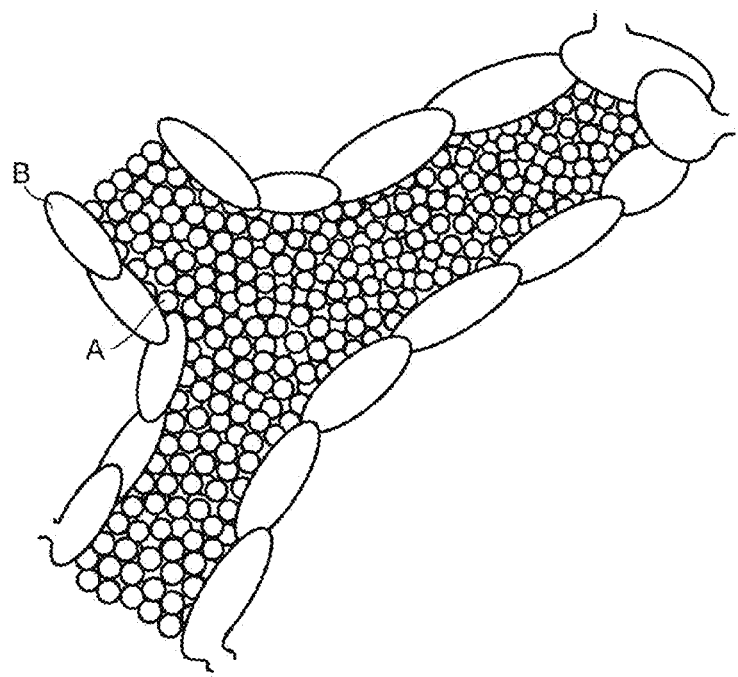
FIG. 3 is a schematic view showing the interior structure of the annular material of a carbon nanostructure according to the present invention.

Furthermore, the annular material is generally constituted from the superficial skin made of the carbon and the carbon particles encapsulated with the superficial skin in accordance with the production process thereof. Concretely, as schematically shown in FIG. 3, the annular material is constituted such that the carbon particles, that is, the grapheme small cells A are enclosed by the grapheme superficial skin B. Here, "graphene" means a hexagonal structure as carbon atoms are arranged in a form of network and corresponds to a single-layered graphite.

Then, the production process of the carbon nanostructure will be described. First of all, an acetylene gas is blown into a silver nitrate-containing ammonia aqueous solution with irradiating ultrasonic wave into the aqueous solution. In this case, preferably, the aqueous solution is agitated at the same time when the aqueous solution is treated by way of the ultrasonic wave. Thereby, the precipitate of silver acetylide is formed in the aqueous solution. The irradiation of ultrasonic wave can be conducted in the same manner as the production process of the metal encapsulated dendritic carbon nanostructure by using an ultrasonic transducer or an ultrasonic cleaner.

Then, the precipitate containing the corresponding solvent is segmented into small groups and set into respective reactive tubes which are also set in a vacuum electric furnace or vacuum high temperature bath and heated at a temperature within a range of 60° C. to 80° C. for 12 hours or more, for example (first thermal treatment). In this case, the silver acetylide is segregated to form the metal encapsulated dendritic carbon nanostructure capsulating the metallic silver particles (refer to FIGS. 1 and 2). Here, FIGS. 1 and 2 are SEM images of the metal encapsulated dendritic carbon nanostructure.

Here, if the precipitate is perfectly dried, the precipitate may become unstable to cause explosion reaction by rubbing stimulation in the same manner as the production process of the metal encapsulated dendritic carbon nanostructure.

Figure 4:
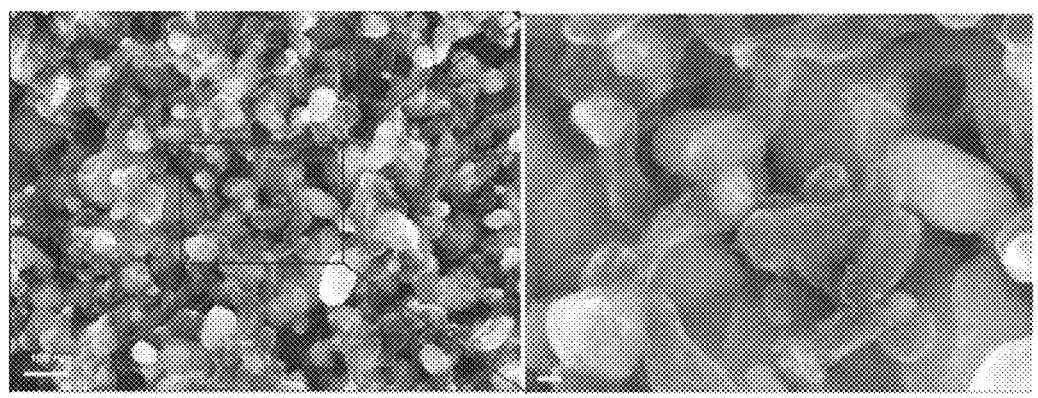
FIG. 4 is a SEM image of a carbon nanostructure intermediary body obtained from the metal encapsulated dendritic nanocarbon structure according to the present invention.

Then, the metal encapsulated dendritic carbon nanostructure is also thermally treated at a temperature within a range of 160° C. to 200° C. (second thermal treatment). The second thermal treatment can be conducted continuous to the first thermal treatment in the same vacuum furnace or vacuum high temperature bath. Therefore, the remaining silver acetylide is exploded in nanoscale by the rapid increase in temperature from the temperature range of the first thermal treatment to the temperature range of the second thermal treatment so that the Ag elements encapsulated in the metal encapsulated dendritic carbon nanostructure are blown off to the outside thereof (refer to FIG. 4). The white portion in FIG. 4 denotes the Ag elements (particles) remaining on the thus obtained carbon nanostructure and the gray portion denotes the carbon.

Figure 5:
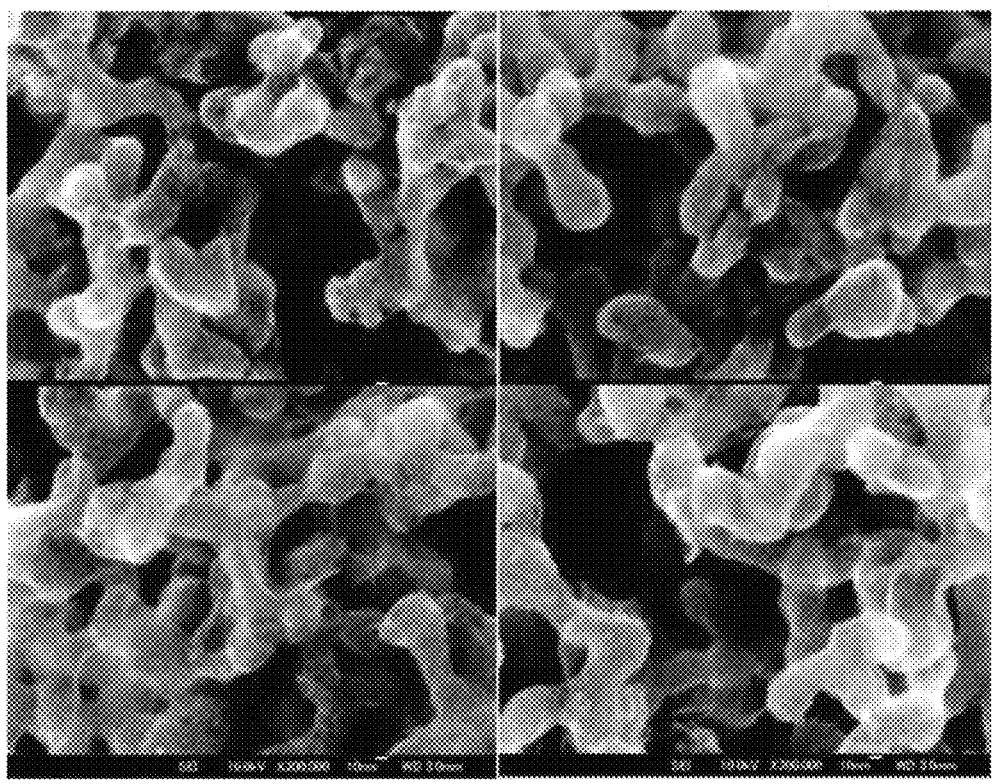
FIG. 5 is a SEM image of a carbon nanostructure according to the present invention.

Moreover, FIG. 5 is a SEM photograph showing the state after the encapsulated Ag elements are blown off from the metal encapsulated dendritic nanostructure. As the result of the detail examination for FIG. 5, it can be confirmed that in the carbon-containing annular or rod-shaped material denoted by the grey portion, a plurality of ejection holes are formed at the superficial skin made of the carbon, as schematically shown in FIG. 3.

The period of time of the second thermal treatment is set within a range of 10 minutes to 30 minutes.

Then, a solving and washing treatment is conducted for the carbon nanostructure to remove the remaining Ag elements and other unstable carbon compounds and thus form the stable carbon nanostructure. In this case, if the solving and washing treatment using silver nitrate is conducted, particularly, the remaining Ag elements can be reused as the silver nitrate effectively and efficiently.

Here, although the solving and washing treatment is not always required, if not employed, the Ag elements, etc., remain on the carbon nanostructure so that the intended pure carbon nanostructure may not be obtained.

The thus obtained carbon nanostructure has high specific surface area sufficiently, but can have much larger specific surface area by way of an additional thermal treatment (third thermal treatment). The third thermal treatment can be conducted as follows. The intermediary body of carbon nanostructure is positioned under a vacuum atmosphere, an inert gas atmosphere or an air atmosphere, and heated at a temperature within a range of 180° C. to 200° C. The period of time of the thermal treatment may be set within a range of 24 hours to 48 hours.

The third thermal treatment may be conducted after washing process using acid which is to be conducted after the first thermal treatment and/or the second thermal treatment.

Without the third thermal treatment, the BET specific surface area of the carbon nanostructure can be 870 $m^2/g$ or more. With the third thermal treatment, the BET specific surface area of the carbon nanostructure can be 1300 $m^2/g$ or more (refer to FIG. 5). FIG. 5 is a SEM image of the carbon nanostructure.

In this case, if appropriate raw materials (a metallic salt and a reducing agent, etc.) for a metal to be encapsulated in the metal encapsulated dendritic carbon nanostructure are employed, the intended metal encapsulated dendritic carbon nanostructure encapsulating various metals can be produced.

(Capacitor)

Then, the capacitor of the present invention will be described. The capacitor includes an electrode active material made of the dendritic carbon nanostructure with the branched carbon-containing rod-shaped or annular material. The carbon nanostructure has high porosity and high specific surface area in itself. Therefore, since the surface areas of the electrodes of the capacitor are increased so as to adsorb various ions, the capacitor can have high electrostatic capacitance and thus to be applicable for a practical supercapacitor.

The carbon nanostructure constituting the capacitor of the present invention can be obtained by thermally treating the metal acetylide dendritic crystalline body. Concretely, the metal acetylide dendritic crystalline body can be produced as follows. An acetylene gas is contacted with a solution containing the corresponding metal or metallic salt at the gas-liquid interface thereof while an ultrasonic wave is applied to the solution, thereby forming the metal acetylide dendritic crystalline body as the metal encapsulated dendritic carbon nanostructure containing the metal and carbon. In this case, the solution may be agitated when the acetylene gas is contacted with the solution at the gas-liquid interface.

The thermal treatment for the metal acetylide dendritic crystalline body may include a first thermal treatment for segregating carbon elements on the metal acetylide dendritic crystalline body to form a carbon-covering metal acetylide dendritic nanostructure and a second thermal treatment for phase-separating the metal elements encapsulated in the carbon-covering metal acetylide dendritic nanostructure.

Then, a solving and washing treatment may be performed for the carbon nanostructure intermediary body obtained by phase-separating the metal elements encapsulated in the carbon-covering metal acetylide dendritic nanostructure so as to remove the remaining metal elements.

A third thermal treatment using hot water may be performed for the carbon-covering metal acetylide dendritic nanostructure as occasion demands.

The metal or metallic salt is appropriately selected from the ones which can function as forming a complex with the acetylene gas, etc. as a carbon raw material. It is known that copper or silver has the function so as to form the complex with the carbon raw material gas. The silver is preferable.

The electrolytic fluid, the electrolyte and the separator are not restricted, but may be made of well known ones available, respectively.

Hereinafter, the capacitor of the present invention will be described concretely.

(Carbon Nanostructure)

First of all, the carbon nanostructure constituting the electrodes of the capacitor of the present invention will be described. The carbon nanostructure to be used for the electrodes of the capacitor of the present invention, as described above, is a dendritic carbon nanostructure with a branched carbon-containing rod-shaped or annular material. Therefore, the carbon nanostructure has the same characteristics as described above.

Since the carbon nanostructure has the above-described dendritic structure and the structure shown in FIG. 3, the carbon nanostructure has many cavity cells originated from the carbon particles inside the dendritic structure, so that the carbon nanostructure has high porosity and high specific surface area in itself. In the case that the carbon nanostructure is used for the electrode active material of the capacitor, the carbon nanostructure can adsorb various ions in a large amount so as to have high electrostatic capacitance. Furthermore, since the nanostructure units are connected with one another, the electric conduction between the adjacent nanostructure units is excellent.

Therefore, if the carbon nanostructure is used for the electrodes of the capacitor, the capacitor can be constituted as a supercapacitor.

The production process of the carbon nanostructure has been already described, and thus omitted.

(Electrolyte)

Then, the electrolyte to be used for the capacitor of the present invention will be described. The electrolyte may be a solid electrolyte or a liquid electrolyte, but in view of high speed electric charge and discharge, preferably a liquid electrolyte (electrolyte fluid) which can perform ionic conduction at high speed.

The electrolyte fluid is classified into aqueous type or nonaqueous type on the condition whether a water or an organic solvent is used for the solvent of the electrolyte.

In the use of aqueous type electrolyte fluid, the electrolyte contained in the aqueous electrolyte fluid is sulfuric acid, potassium hydroxide, sodium hydroxide, lithium hydroxide, sodium chloride, hydrochloric acid, sodium fluoride, etc., for example.

In the use of nonaqueous type electrolyte fluid, the electrolyte contained in the nonaqueous electrolyte fluid is $(C_2H_5)_4NBF_4$, $CH_3(C_2H_5)_3NBF_4$, $BF_4$ salt or derivative of spiro-(1,1')-bipyrrolidinium. An ionic fluid such as a salt of imidazolium derivative (EMI) or diethyl-methyl-(2-methoxyethyl) ammonium (DEME) may be used as the nonaqueous type electrolyte fluid.

In the use of the aqueous type electrolyte fluid, as the organic solvent can be exemplified propylene carbonate (PC), acetonitrile, ethylene carbonate, butylene carbonate, γ-butyrolactone, γ-valerolactone, N-methylpyrrolidine, nitromethane, sulfolane, dimethyl sulfoxide, dimethyl carbonate, ethyl methyl carbonate, diethyl carbonate. These organic solvents can be employed independently or in combination therewith.

(Capacitor)

Figure 6:
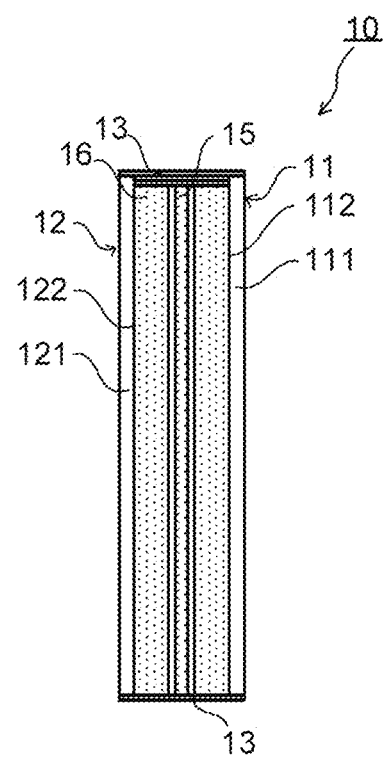
FIG. 6 is a schematic view showing an embodiment of the capacitor of the present invention.

Then, the capacitor of the present invention will be described. FIG. 6 is a schematic view showing an embodiment of the capacitor of the present invention.

The capacitor 10 shown in FIG. 6 includes a positive electrode 11 and a negative electrode 12. The positive electrode 11 includes a positive collecting electrode 111 and an electrode layer (electrode active material) 112 formed on the positive collecting electrode 111 and made of the above-described carbon nanostructure. The negative electrode 12 includes a negative collecting electrode 121 and an electrode layer (electrode active material) 122 formed on the negative collecting electrode 121 and made of the above-described carbon nanostructure.

A pair of insulating gaskets 13 are provided on the upper side and the lower side of the positive collecting electrode 111 and the negative collecting electrode 121, respectively, for insulation. An enclosed space is formed by the positive collecting electrode 111, the negative collecting electrode 121 and the insulating gaskets 13, and immersed in 1 mol of sulfuric acid contained in a given container. Then, an electrolyte fluid 16 is charged into the enclosed space.

A separator 15 is placed in the electrolyte fluid 16.

In the use of the aqueous type electrolyte fluid, the positive collecting electrode 111 and the negative collecting electrode 121 are made of electric good conductor with corrosion resistance such as platinum (Pt), palladium (Pd), gold (Au), stainless steel. In the use of the nonaqueous type electrolyte fluid, the collecting electrodes 111 and 121 are made of aluminum (Al). In these cases, if the collecting electrodes 111 and 121 are contacted with the electrolyte fluid 16, the collecting electrodes 111 and 121 can be prevented from being corroded due to the contact thereof with the electrolyte fluid 16. The platinum and the like may be shaped in a form of foil or sheet.

The positive collecting electrode 111 and the negative collecting electrode 121 function as supporting substrates for the electrode layers 112 and 122 made of the respective carbon nanostructures and reducing the electric resistance of the capacitor 10 as a whole. In the case that the positive electrode 11 and the negative electrode 12 are made only of the electrodes 112 and 122 which are formed from the respective carbon nanostructures, the positive collecting electrode 111 and the negative collecting electrode 121 may be appropriately omitted.

The electrodes 11 and 12 may be shaped in a form of leaf (coil cell or rectangular laminate cell) or a form of ribbon (rolling cylindrical cell).

The electrode layers 112 and 122 may include conductive auxiliary agent or binding agent in addition to the carbon nanostructure.

As the conductive auxiliary agent can be exemplified ketjenblack, acetylene black, natural/artificial graphite. As the binding agent can be exemplified polytetrafluoroethylene (PTFE), polyvinylidene fluoride (PVDF), PVA.

The separator 15 may be made of a well known material such as a polyethylene porous film, a polypropylene nonwoven cloth, a glass fiber nonwoven cloth, a cellulose special paper.

The capacitor 10 in FIG. 6 is configured such that the positive electrode 11 and the negative electrode 12 includes the electrode layers 112 and 122 made of the dendritic carbon nanostructure with the branched carbon-containing rod-shaped or annular material. Therefore, the electrode layers 112 and 122, that is, the positive electrode 11 and the negative electrode 12 has high porosity and high specific surface area. As a result, since the electrode surface area of the capacitor 10 is increased so as to adsorb various ions in a large amount, the capacitor 10 can have high electrostatic capacitance and is practically applicable as a supercapacitor.

EXAMPLE

Carbon Nanostructure

Example 1

Figure 7:
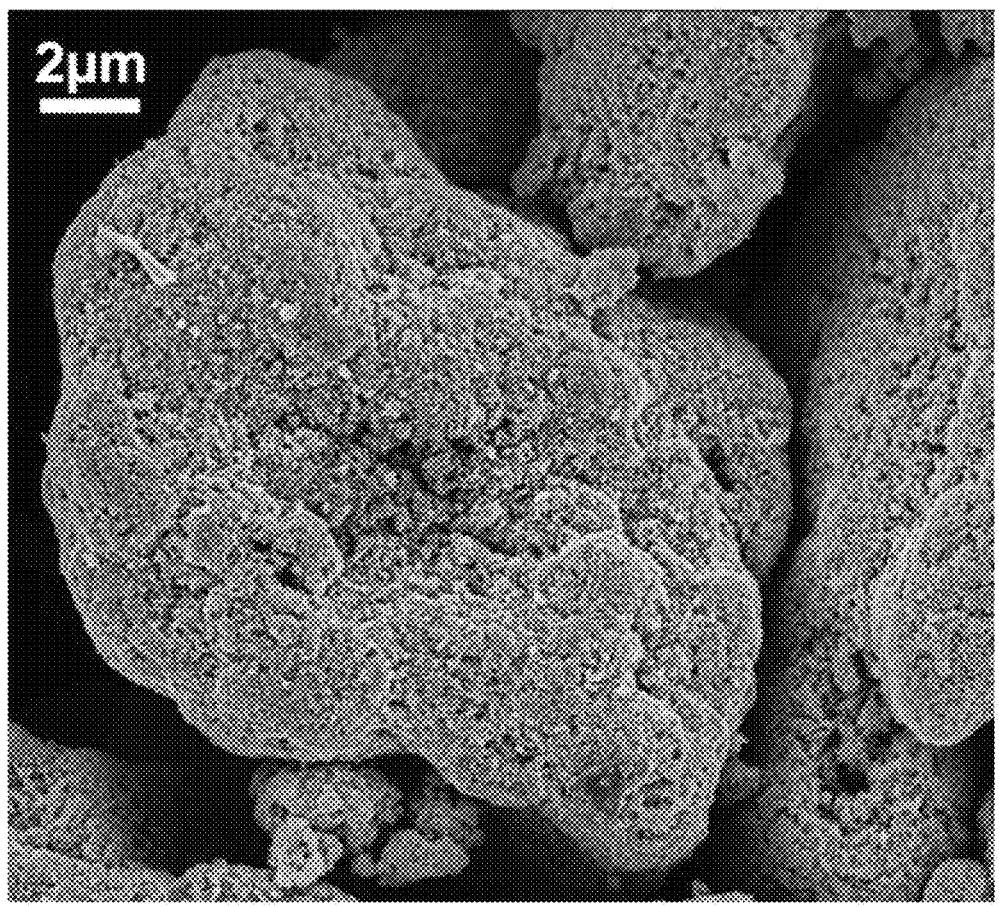
FIG. 7 is a SEM image of a precipitate obtained during the production process of the metal encapsulated dendritic carbon nanostructure (carbon nanostructure) of the present invention.

First of all, an ammonia aqueous solution (1.9%) containing a 1.1 mol % silver nitrate was prepared in a flask and the remaining oxygen was blown off from the flask using inert gas such as argon or dry nitrogen. Then, an acetylene gas was blown to 150 mL of the ammonia aqueous solution at a rate of 25 mL/min for about four hours while the ammonia aqueous solution was agitated and vibrated by immersing an ultrasonic transducer therein. Thereby, a solidified product of silver acetylide started to be formed and precipitated in the ammonium aqueous solution. Then, the thus obtained precipitate was filtered with a membrane filter while the precipitate was washed with methanol during the filtration thereof so that the methanol was infiltrated into the precipitate to some degrees. FIG. 7 shows the appearance of the precipitate. If the reaction time is elongated, the size of the precipitate can be enlarged up to several hundred micrometers.

Then, the precipitate containing the methanol therein was segregated and input into respective test tubes, each having a diameter of about 6 mm, per 50 mg. The test tubes were set in a vacuum heating container and heated within a temperature range of 60° C. to 80° C. for 12 hours. In this time, the thus segregated precipitate was almost converted into the corresponding metal encapsulated dendritic carbon nanostructure encapsulating Ag particles, but if the metal encapsulated dendritic carbon nanostructure is used as an electrode material, the segregated precipitate is heated slowly up to a temperature of 150° C. and then heated at a temperature within a range of 180° C. to 200° C. for several hours so that the encapsulated Ag particles coalesce with one another and thus grew to stabilize the shape of the outer carbon layer.

Then, the thus obtained metal encapsulated dendritic carbon nanostructure was heated continuously and rapidly up to a temperature within a range of 160° C. to 200° C. and maintained for 20 minutes. In this time, nanoscale explosion reaction was caused in the corresponding test tubes so that the encapsulated Ag elements were blown off to form many ejection holes at the surface and interior of the metal encapsulated dendritic carbon nanostructure (refer to FIG. 4).

Figure 8:
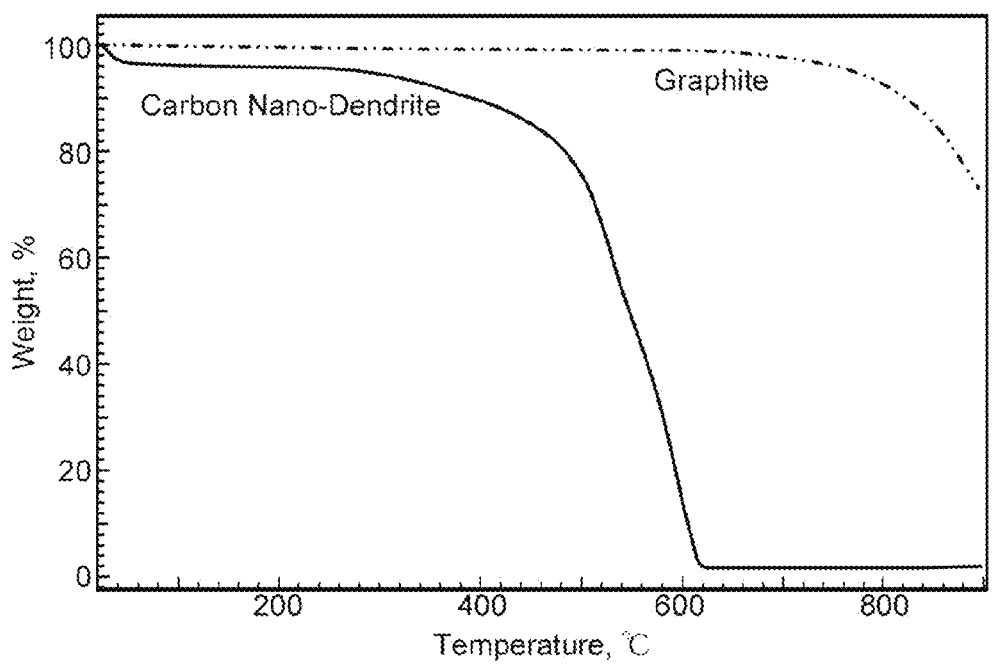
FIG. 8 is a graph in TGA (thermogravimetric measurement) of the carbon nanostructure intermediary body.

As the result of the TGA (thermogravimetric measurement) for the metal encapsulated dendritic carbon nanostructure after the nanoscale explosion reaction, such a graph as shown in FIG. 8 was obtained and it is suggested that the metal encapsulated dendritic carbon nanostructure contains 5% of water, 20% of carbon component which is to be fired in air at a temperature within a range of 250° C. to 500° C. and the graphite-like remnant of polymer state which is to be fired at a temperature of 600° C.

Then, the carbon nanostructure was washed with concentrated nitric acid for one hour to solve and remove the remaining Ag elements thereon as silver nitrate and unstable carbon compounds.

Then, the carbon nanostructure was heated at a temperature of 200° C. for 20 minutes under vacuum atmosphere (refer to FIG. 5). The diameter and length of the branched carbon-containing portion were about 40 nm and 100 nm, respectively.

Figure 9:
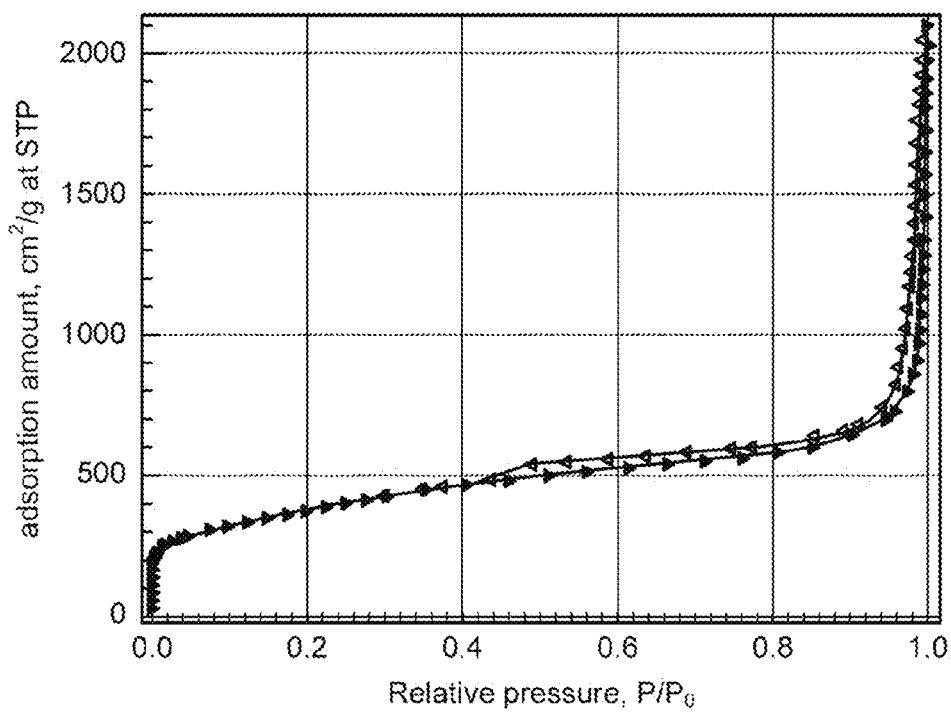
FIG. 9 is an adsorption curve of the carbon nanostructure.

FIG. 9 is an adsorption curve of the carbon nanostructure. The adsorption gas used in FIG. 9 was nitrogen gas. As apparent from FIG. 9, the gas adsorption amount of the carbon nanostructure is increased as the pressure of the adsorption gas is increased so that it is turned out that the carbon nanostructure can exhibit high gas adsorption characteristics. Also, it is turned out that the BET specific surface area of the carbon nanostructure is 1325 m$^2$/g. Here, without the thermal treatment at 200° C. for 20 minutes, the BET specific surface area of the carbon nanostructure is 870 m$^2$/g.

Figure 10:
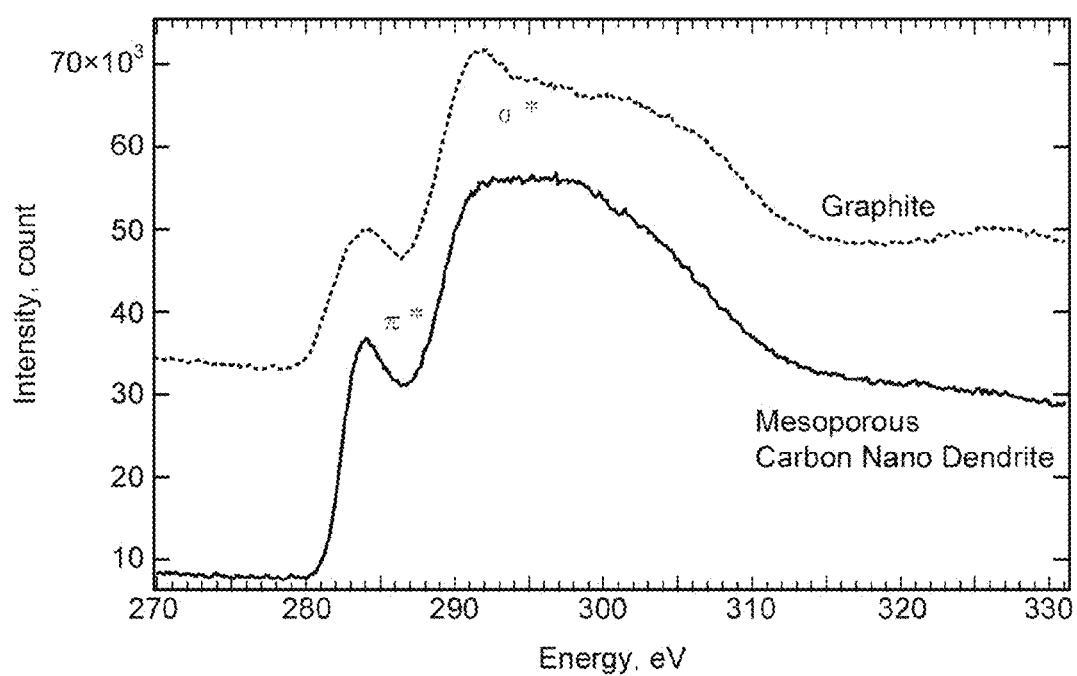
FIG. 10 is an electron energy loss spectrum (EELS) of the carbon nanostructure.

FIG. 10 is an electron energy loss spectrum (EELS) of the carbon nanostructure. In comparison with the electron energy loss spectrum of graphite, the energy loss spectrum relating to π* energy level of the carbon nanostructure is similar to the one of the graphite or enhanced more than the one of the graphite in intensity due to the narrow line width thereof which suggests the π* orbital of the carbon nanostructure is elongated. On the other hand, the energy loss spectrum relating to σ* energy level of the carbon nanostructure is similar to the one of amorphous carbon.

Figure 11:
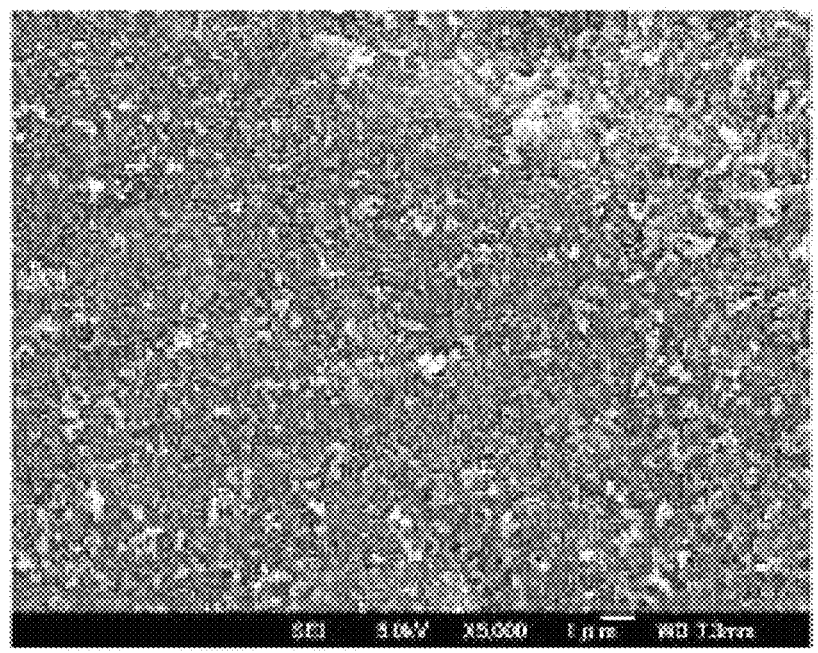
FIG. 11 is a SEM photograph of pellets obtained from the carbon nanostructure.
Figure 11:
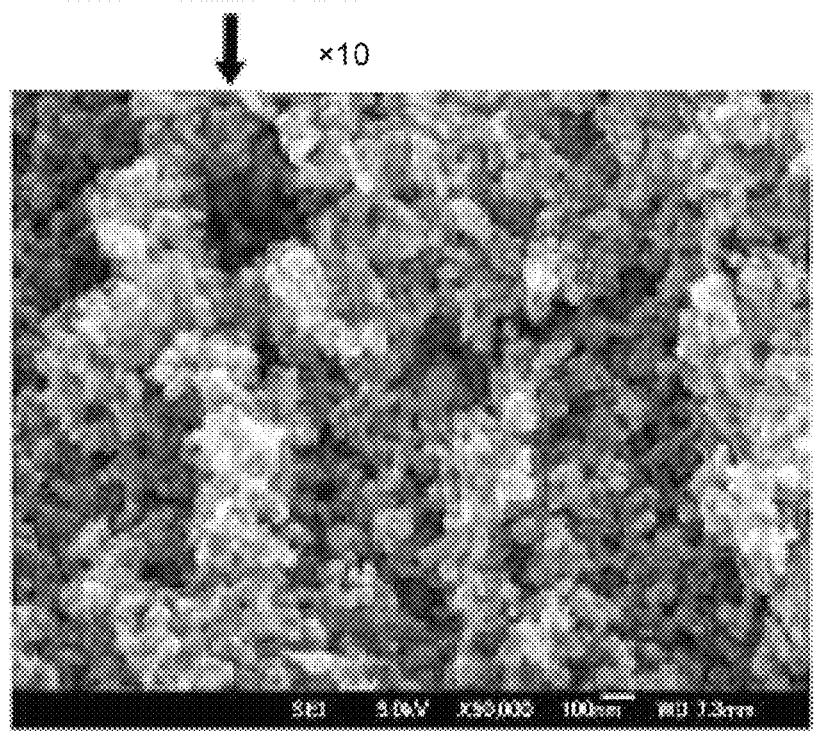
Figure 12:
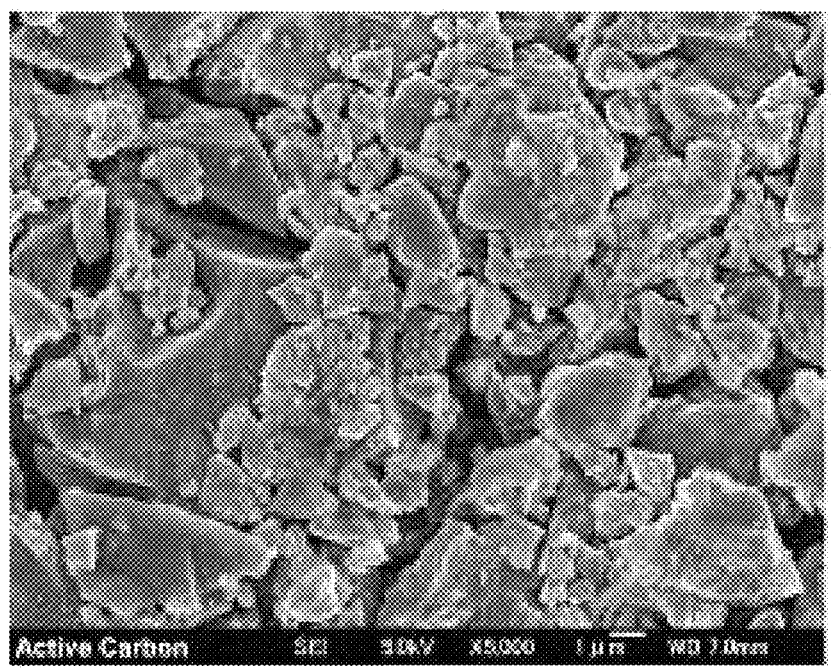
FIG. 12 is a SEM photograph of pellets of an activated carbon commercially available.
Figure 12:
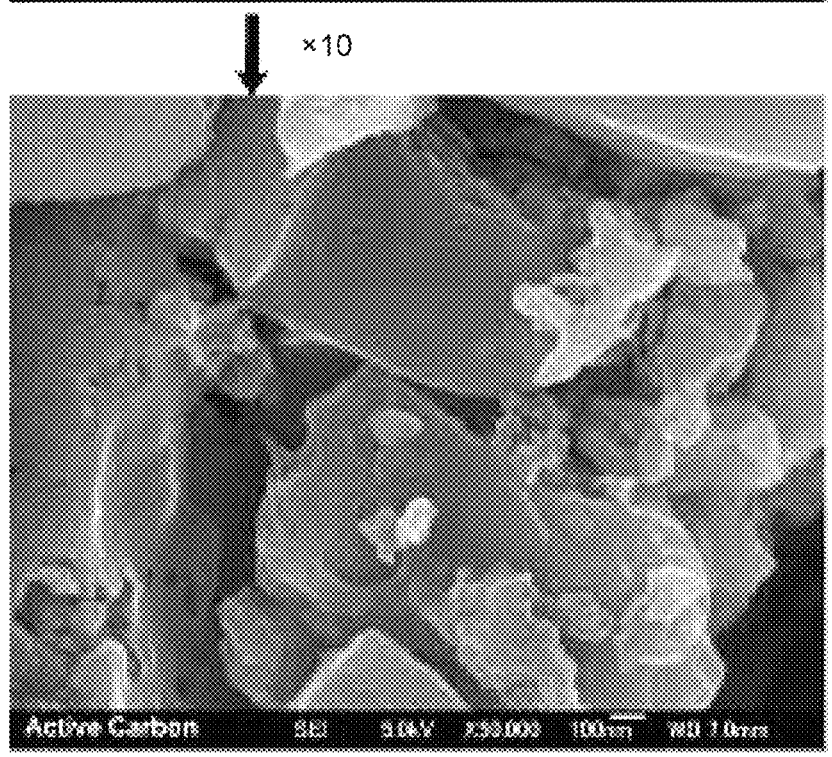

FIG. 11 is the SEM photograph of the pellet of the carbon nanostructures obtained by applying a pressure of 1.0 ton/cm$^3$ thereto. FIG. 12 is a SEM photograph of the pellet made of activated carbons commercially available. As apparent from FIGS. 11 and 12, the pellet of the carbon nanostructure in this Example has high continuity and much higher electric conduction. It is considered that the wholly continuity of the pellet made of the carbon nanostructures is originated from that the dendritic structures of the carbon nanostructures are complicatedly intertwined with one another at their interfaces to exhibit the effect of hook and loop fastener (registered trademark).

Example 2

In this Example, the intended carbon nanostructure was produced in the same manner as the carbon nanostructure in Example 1 except that the amount of the ammonia aqueous solution containing the 1.1 mol % silver nitrate was changed to 1000 mL from 150 mL, and the blow period of the acetylene gas was changed to 30 minutes from 4 minutes, and an ultrasonic cleaner was employed instead of the ultrasonic transducer for conducting the irradiation of ultrasonic wave. In the use of the ultrasonic cleaner, the container containing the aqueous solution was set in the ultrasonic cleaner.

As a result, the intended carbon nanostructure was produced as in Example 1. Without the vacuum heating, the BET specific surface area of the carbon nanostructure was 1600 m$^2$/g. The diameter and length of the branched carbon-containing portion were about 60 nm and 100 nm, respectively.

Example 3

In this Example, the intended carbon nanostructure was produced in the same manner as the carbon nanostructure in Example 2 except that 500 mL of the ammonia aqueous solution was input into the flask in advance and 500 mL of the remaining ammonia aqueous solution was dropped into the flask for 30 minutes. As a result, the intended carbon nanostructure was produced as in Example 1. Without the vacuum heating, the BET specific surface area of the carbon nanostructure was 1800 m$^2$/g. The diameter and length of the branched carbon-containing portion were about 100 mm and 100 nm, respectively.

Comparative Example 1

In this Example, the intended carbon nanostructure was produced in the same manner as in Example 1 except that an phenylacetylene gas under saturated vapor pressure was introduced by bubbling an argon gas instead of the acetylene gas. In this case, the intended dendritic carbon nanostructure was not produced.

Capacitor

Example 4

First of all, an ammonia aqueous solution (1.9%) containing a 1.1 mol % silver nitrate was prepared in a flask and the remaining oxygen was blown off from the flask using inert gas such as argon or dry nitrogen. Then, an acetylene gas was blown to 150 mL of the ammonia aqueous solution at a rate of 50 mL/min for about 30 minutes while the ammonia aqueous solution was agitated and vibrated by immersing an ultrasonic transducer therein. Thereby, a solidified product of silver acetylide was precipitated in the ammonium aqueous solution. Then, the thus obtained precipitate was filtered with a membrane filter while the precipitate was washed with methanol during the filtration thereof so that the methanol was infiltrated into the precipitate to some degrees.

Then, the precipitate containing the methanol therein was segregated and input into respective 34 holes of a cassette made of polytetrafluoroethylene, each hole having a diameter of about 10 mm, per 300 mg. The cassette was set in a vacuum heating container and heated within a temperature range of 60° C. to 80° C. for 12 hours to conduct the desorption of the solvent and the carbonization of the skin of the thus obtained dendritic nanostructures.

Then, the thus obtained dendritic carbon nanostructure was continuously and rapidly heated up to a temperature within a range of 160° C. to 200° C. and maintained for 20 minutes. In this time, nanoscale explosion reaction was caused in the corresponding holes of the cassette to phase-separate the carbon nanostructures so that the encapsulated Ag elements were blown off to form many ejection holes at the surface and interior of the dendritic carbon nanostructure.

Then, the thus obtained dendritic carbon nanostructure intermediary body was washed with concentrated nitric acid for one hour to solve and remove the remaining Ag elements thereon as silver nitrate and unstable carbon compounds. Then, the dendritic carbon nanostructure intermediary body was washed with hot water to obtain the intended carbon nanostructure.

The BET specific surface area of the carbon nanostructure was 1506 m2/g. The measurement of the BET specific surface area was conducted using the BELSORP-MINI II made by BEL Japan, Inc.

Then, after a Teflon (registered trademark) resin (micropowder of 1 μm or less, made by Sigma-Aldrich Corporation) was dispersed in an ethanol solution by way of ultrasonic wave, the Teflon resin and an acetylene black (DENKI KAGAKU KOGYO KABUSHI KIKAISHA) were mixed with the carbon nanostructure under the condition of carbon nanostructure:acetylene black:Teflon resin=8:1:1. These materials were mixed in a mortar to form an electrode material.

Then, 10 mg of the electrode material was weighed, charged into a tablet forming machine and pressed to form pellets, each having a size of 10 mmφ×500 μm.

Then, the pellets were used as the electrode layers 112 and 122 shown in FIG. 6, supported by the positive collecting electrode 111 and the negative collecting electrode 121 which were made of platinum plates, and fixed with Teflon (registered trademark) plates 13 as the insulating gaskets. Then, a polyethylene porous film was positioned as a separator 15, and a 1M sulfuric acid solution was charged in the space formed by the positive collecting electrode 111, the negative collecting electrode 121 and the Teflon plates 13. Then, a degassing treatment was conducted to form the capacitor 10 as an evaluation cell.

Then, the electric charge and discharge characteristics of the evaluation cell 10 obtained as described above was examined. The examination result were shown in FIGS. 13 and 14. The electric charge and discharge characteristics was evaluated with the HSV-100 made by HOKUTO DENKO Corp.

Figure 13:
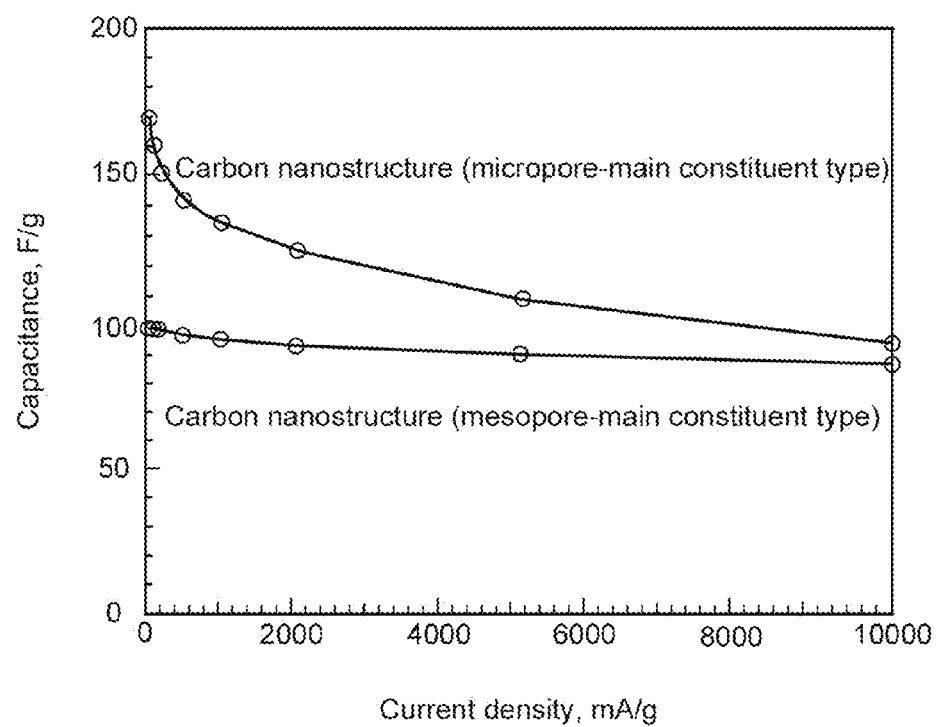
FIG. 13 is a graph showing the relation between the current density and the electrostatic capacitance of the capacitor 10.

In FIG. 13, the ordinate axis designates an electrostatic capacitance on triple pole standard and the abscissa axis designates a current density which is obtained by dividing a current by an electrode surface area. The electrostatic capacitance was calculated per unit weight on triple pole standard as follows. Namely, when the summation in weight of both electrodes is designated by "w", the current to be flowed is designated by "I", the maximum value of the electric charge and discharge voltage is designated by "Vh" (=0.8 V) and the minimum value of the electric charge and discharge is designated by "Vo" (=0 V), if the average voltage decreasing speed "R" (=ΔV/sec) was calculated within a range of 20% to 80% of the maximum voltage "Vh", the electrostatic capacitance can be represented by the equation of:

$$F=4\times I/(w\times R)$$

Figure 14:
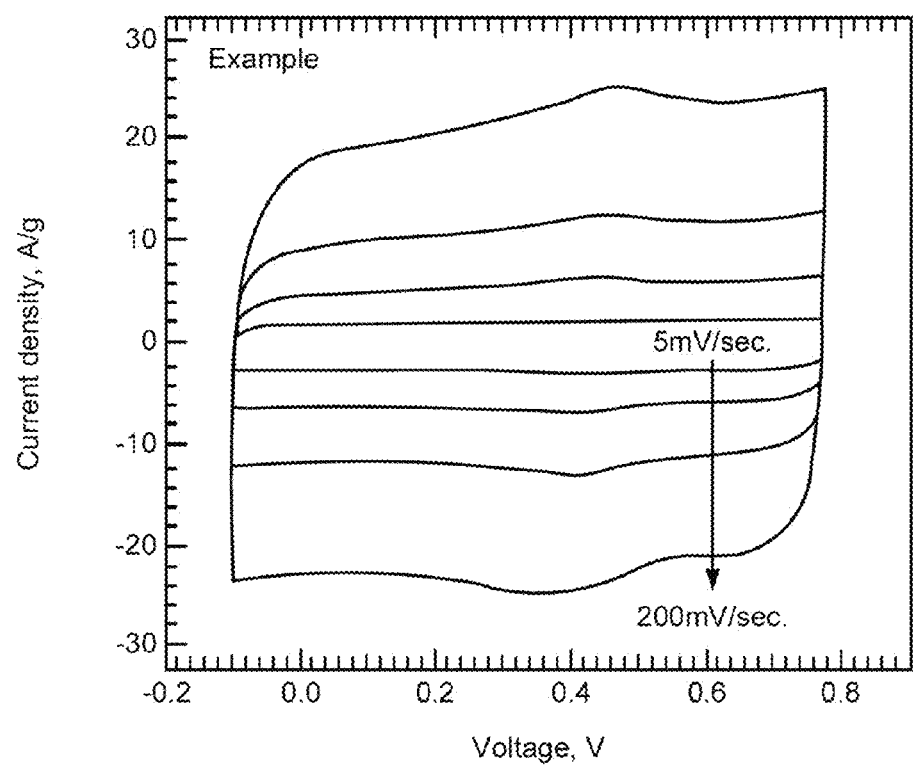
FIG. 14 is a graph showing the C-V characteristics in Example 4.
Figure 15:
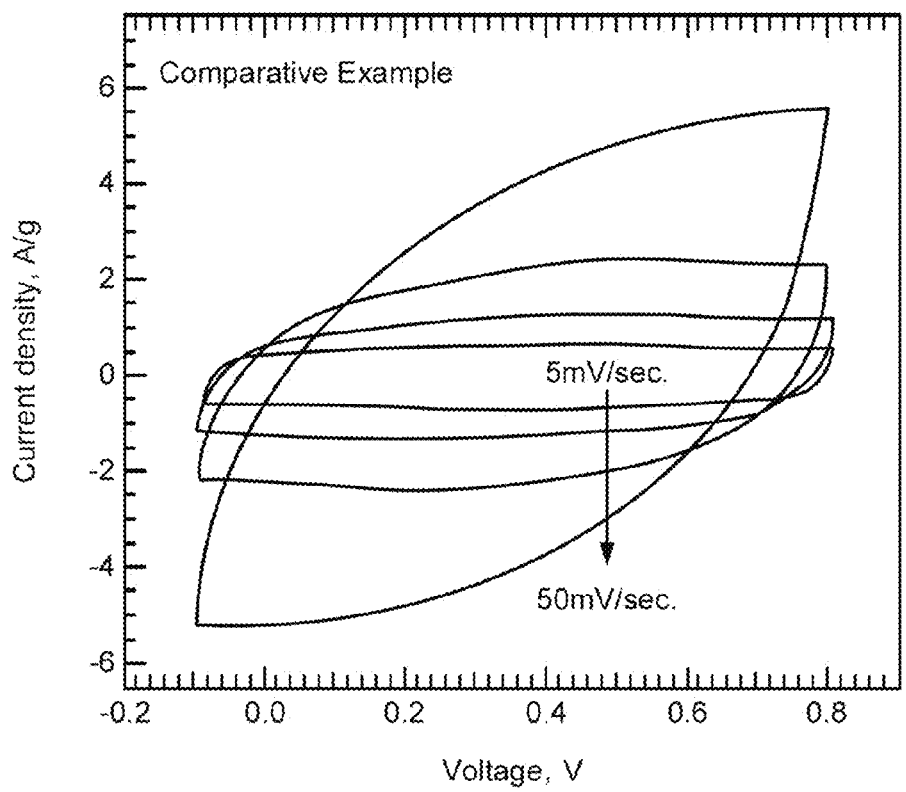
FIG. 15 is a graph showing the C-V characteristics in Comparative Example 2.

FIG. 14 is a graph showing C-V (cyclic voltammetry) characteristics on the triple cell standard. The sweeping speed was set within a range of 5 to 200 mV/sec in a voltage range from −0.1V to 0.8V. In FIG. 15, the sweeping speed was set within a range of 5 to 50 mV/sec.

Example 5

The carbon nanostructure obtained in Example 4, the acetylene black and a Teflon resin (DU PONT-MITSUI FLUOROCHEMICALS COMPANY, LTD., 6-J) were mixed in a mortar under the condition of carbon nanostructure:acetylene black:Teflon=8:1:1 in weight ratio, and stretched with two stretching rolls to form a sheet with a thickness of about 300 μm. The sheet was punched out into circular plates as sheet electrodes, each having a diameter of 14 mm, with a punching machine. The sheet electrodes were employed as the electrode layers 112 and 122 supported by the positive collecting electrode 111 and the negative collecting electrode 121 which are made of platinum plates, and fixed with the Teflon plates 13 as the insulating gaskets.

Then, a 1M/kg tetraethylammonium bromide-containing propylene carbonate solution (made by TIMIYAMA PURE INDUSTRIES, Ltd.) was charged as an electrolyte in the space formed by the positive collecting electrode 111, the negative collecting electrode 121 and the Teflon plates 13. The separator 15 was made of glass fiber-containing paper filter. Moreover, a double cell for evaluation was made of the HS FLAT CELL made by Hohsen Corp. The sheet electrodes were degassed and infiltrated with the electrolyte fluid to form the intended cell structure. The electric charge and discharge characteristics was measured in the same manner as in Example 4 under the condition of the maximum value Vh of electric charge and discharge voltage being set to 2.5V. The measurement result was shown in FIG. 16.

Comparative Example 2

The intended electrodes were formed in the same manner in Example 4 except that a powdery activated carbon commercially available (reagent made by KANTO CHEMICAL CO., INC.) was employed instead of the carbon nanostructure. The capacitor was formed using the electrodes so as to examine the electric charge and discharge characteristics thereof. The measurement result was shown in FIG. 15. The BET specific surface area of the activated carbon was 1320 m²/g.

Comparative Example 3

The intended electrodes were formed in the same manner in Example 5 except that the powdery activated carbon in Example 4 was employed instead of the carbon nanostructure. The capacitor was formed using the electrodes so as to examine the electric charge and discharge characteristics thereof. The measurement result was shown in FIG. 16.

FIG. 13 is a graph showing the relation between the current density and the electrostatic capacitance of the capacitor 10. As apparent from FIG. 13, it is turned out that the capacitor 10 in Example 4 can exhibit higher electrostatic capacitance relatively because the electrostatic capacitance is slightly decreased when the current density is increased up to 250 mA/cm². On the other hand, the electrostatic capacitance of the capacitor made of the activated carbon commercially available is remarkably decreased as the current density is increased.

Namely, the capacitor 10 can exhibit excellent rate characteristics so as to have high electrostatic capacitance as a whole even under the condition of large current density and thus be usable as a supercapacitor. On the other hand, the capacitor made of the conventional activated carbon has lower electrostatic capacitance as the current density is increased so as not to be usable as a supercapacitor.

As shown in FIG. 14, it is turned out that the capacitors 10 obtained in these Examples can exhibit the respective rectangular graphs relating to the C-V characteristics so that ion desorption can be performed even at high sweeping speed, and thus excellent charge and discharge characteristics.

As shown in FIG. 15, on the other hand, the capacitors made of the activated carbon commercially available exhibit respective not rectangular graphs relating to the C-V characteristics and thus cannot exhibit excellent charge and discharge characteristics.

Figure 16:
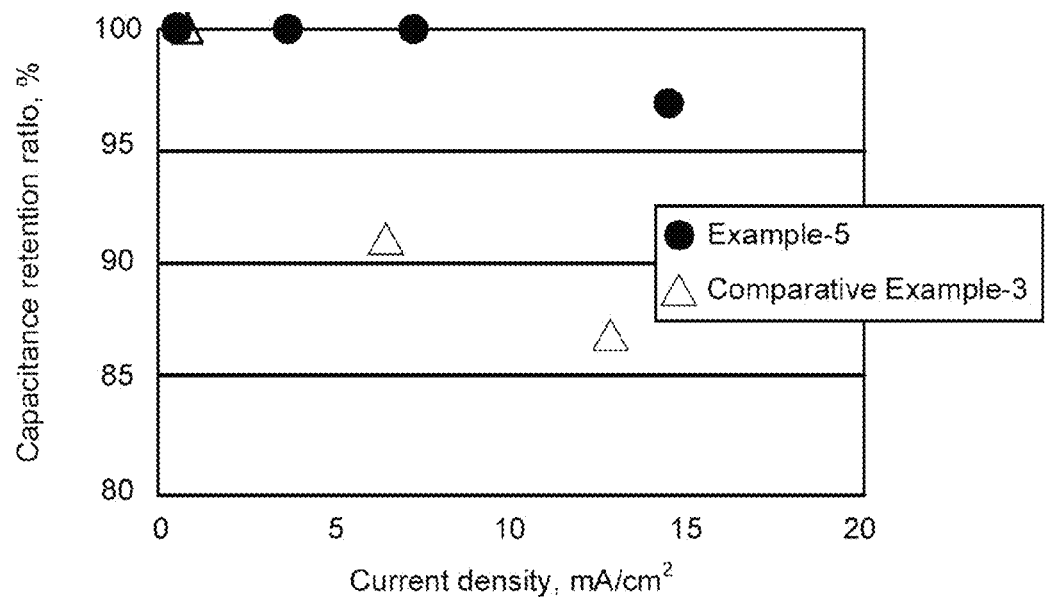
FIG. 16 is a graph showing the relation between the current density and the electrostatic capacitance in Example 5 and Comparative Example 3.

In the capacitor made of the nonaqueous electrolyte fluid, as shown in FIG. 16, the electrostatic capacitance is slightly decreased when the current density exceeds 10 mA/cm² so as to exhibit excellent rate characteristics.

Although the present invention was described in detail with reference to the above examples, this invention is not limited to the above disclosure and every kind of variation and modification may be made without departing from the scope of the present invention.

What is claimed is:

1. A dendritic carbon nanostructure having a branched rod-shape or annular-shape, the carbon nanostructure comprising:
    a plurality of cavity cells each having a cell wall made of graphene and a cavity enclosed by the cell wall; and
    a superficial skin made of graphene having a cell structure, the superficial skin enclosing the plurality of cavity cells,
    wherein each of the cavity cells is smaller than a cell of the cell structure of the superficial skin.

2. The dendritic carbon nanostructure as set forth in claim 1, wherein the dendritic carbon nanostructure is configured as a three-dimensional structure.

3. The dendritic carbon nanostructure as set forth in claim 1, wherein a length of a branched portion of said dendritic carbon nanostructure is 150 nm or less.

4. The dendritic carbon nanostructure as set forth in claim 1, wherein a diameter of a branched portion of said dendritic carbon nanostructure is 150 nm or less.

5. The dendritic carbon nanostructure as set forth in claim 1, having a BET specific surface area of 870 m²/g or more.

6. The dendritic carbon nanostructure as set forth in claim 5, wherein said BET specific surface area is 1300 m²/g or more.

7. A pellet comprising a carbon nanostructure as set forth in claim 1, said carbon nanostructure being pressed.

8. A carrier for supporting a catalyst comprising a carbon nanostructure as set forth in claim 1.

9. A gas molecule storage material comprising a carbon nanostructure as set forth in claim 1.

10. A capacitor comprising a pair of electrodes, an electrolyte fluid located between said pair of electrodes, a separator positioned in said electrolyte fluid,
    wherein at least one of said electrodes comprises a dendritic carbon nanostructure having a branched rod-shape or annular-shape,
    wherein the dendritic carbon nanostructure comprises:
        a plurality of cavity cells each having a cell wall made of graphene and a cavity enclosed by the cell wall; and
        a superficial skin made of graphene having a cell structure, the superficial skin enclosing the plurality of cavity cells,
        wherein each of the cavity cells is smaller than a cell of the cell structure of the superficial skin.

11. The capacitor as set forth in claim 10, wherein the dendritic carbon nanostructure is configured as a three-dimensional structure.

12. The capacitor as set forth in claim 10, wherein a length of a branched portion of said dendritic carbon nanostructure is 150 nm or less.

13. The capacitor as set forth in claim 10, wherein a diameter of a branched portion of said dendritic carbon nanostructure is 150 nm or less.

14. The capacitor as set forth in claim 10, wherein the dendritic carbon nanostructure has a BET specific surface area of 870 m²/g or more.

15. The capacitor as set forth in claim 14, wherein said BET specific surface area is 1300 m²/g or more.

16. The capacitor as set forth in claim 10, wherein said dendritic carbon nanostructure is a carbon obtained through a thermal treatment for a metal acetylide dendritic crystalline body.

17. The capacitor as set forth in claim 16, wherein said metal acetylide crystalline body is configured as a metal encapsulated dendritic carbon nanostructure containing a metal and a carbon by contacting an acetylene gas with a solution containing said metal or a salt of said metal at a gas-liquid interface thereof while an ultrasonic wave is applied to said solution.

18. The capacitor as set forth in claim 16, wherein said solution is agitated when said acetylene gas is contacted with said solution at said gas-liquid interface thereof.

19. The capacitor as set forth in claim 16, wherein said thermal treatment for said metal acetylide dendritic crystalline body includes a first thermal treatment for segregating carbon elements on said metal acetylide dendritic crystalline body to form a carbon-covering metal acetylide dendritic nanostructure and a second thermal treatment for phase-separating metal elements encapsulated in said carbon-covering metal acetylide dendritic nanostructure.

20. The capacitor as set forth in claim 19, wherein a solving and washing treatment is conducted for a carbon nanostructure intermediary body obtained through the phase-separation of said metal elements from said carbon-covering metal acetylide dendritic nanostructure to remove a remnant of said metal elements.

21. The capacitor as set forth in claim 19, wherein said first thermal treatment is conducted within a temperature range of 60° C. to 80° C.

22. The capacitor as set forth in claim 19, wherein said second thermal treatment is conducted within a temperature range of 160° C. to 200° C. continuously following said first thermal treatment.

23. The capacitor as set forth in claim 19, wherein a third thermal treatment using a hot water is conducted for said dendritic carbon nanostructure.

24. The capacitor as set forth in claim 23, wherein said third thermal treatment is conducted within a temperature range of 80° C. to 100° C.

25. The capacitor as set forth in claim 17, wherein said metal or said salt are silver (Ag) or silver salt.

\* \* \* \* \*